US009278725B2

(12) United States Patent
Matsuda (10) Patent No.: US 9,278,725 B2
(45) Date of Patent: Mar. 8, 2016

(54) STRADDLE ELECTRIC VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/369,176

(22) PCT Filed: Dec. 28, 2011

(86) PCT No.: PCT/JP2011/007335
§ 371 (c)(1),
(2), (4) Date: Jun. 26, 2014

(87) PCT Pub. No.: WO2013/098894
PCT Pub. Date: Jul. 4, 2013

(65) Prior Publication Data
US 2015/0008061 A1 Jan. 8, 2015

(51) Int. Cl.
| | |
|---|---|
| *B62K 11/04* | (2006.01) |
| *B62M 7/02* | (2006.01) |
| *B60L 11/18* | (2006.01) |
| *B62K 25/28* | (2006.01) |
| *B62K 19/40* | (2006.01) |

(52) U.S. Cl.
CPC ............. *B62K 11/04* (2013.01); *B60L 11/1877* (2013.01); *B62K 19/40* (2013.01); *B62K 25/283* (2013.01); *B62K 2204/00* (2013.01); *B62K 2208/00* (2013.01); *B62M 7/02* (2013.01)

(58) Field of Classification Search
CPC ...... B62K 2204/00; B62M 6/40; B62M 6/55; B62M 6/70; B62M 6/90; B60K 15/07
USPC ............... 180/220, 229, 206.1, 206.4, 206.7, 180/207.3, 65.6, 65.7, 68.4
See application file for complete search history.

(56) References Cited

U.S. PATENT DOCUMENTS

| | | | | |
|---|---|---|---|---|
| 5,501,292 | A * | 3/1996 | Kawashima et al. | 180/220 |
| 6,155,369 | A * | 12/2000 | Whittaker | 180/220 |
| 8,312,954 | B2 * | 11/2012 | Johnson et al. | 180/220 |
| 8,783,405 | B2 * | 7/2014 | Irie et al. | 180/312 |
| 2008/0078603 | A1 * | 4/2008 | Taji et al. | 180/312 |
| 2008/0227578 | A1 * | 9/2008 | Imura | 475/82 |

(Continued)

FOREIGN PATENT DOCUMENTS

| | | |
|---|---|---|
| EP | 2210803 A2 | 7/2010 |
| EP | 2574530 A1 | 4/2013 |

(Continued)

OTHER PUBLICATIONS

ISA Japanese Patent Office, International Search Report of PCT/JP2011/007335, WIPO, Apr. 17, 2012, 2 pages.

(Continued)

*Primary Examiner* — Anne Marie Boehler
(74) *Attorney, Agent, or Firm* — Alleman Hall McCoy Russell & Tuttle LLP (57) ABSTRACT

A straddle electric vehicle includes a battery case which accommodates a battery as an electric power supply for an electric motor, and is placed between a front wheel and a rear wheel; and a swing arm pivotably coupled at its front end portion to a vehicle body frame such that the swing arm supports the rear wheel by its rear end portion; wherein the electric motor is placed rearward relative to the battery case and forward relative to the rear wheel.

14 Claims, 4 Drawing Sheets

(56) References Cited

U.S. PATENT DOCUMENTS

| | | |
|---|---|---|
| 2011/0036657 A1 | 2/2011 | Bland et al. |
| 2011/0259660 A1 | 10/2011 | Johnson et al. |
| 2013/0032424 A1* | 2/2013 | Sand .............................. 180/220 |
| 2013/0319782 A1* | 12/2013 | Matsuda ....................... 180/220 |

FOREIGN PATENT DOCUMENTS

| | | |
|---|---|---|
| EP | 2639092 A1 | 9/2013 |
| EP | 2660097 A1 | 11/2013 |
| JP | 5180848 U | 6/1976 |
| JP | 05105147 A | 4/1993 |
| JP | 05105176 A | 4/1993 |
| JP | 06064580 A | 3/1994 |
| JP | 06135371 A | 5/1994 |
| JP | 2000038184 A | 2/2000 |
| JP | 2001119801 A | 4/2001 |
| JP | 2004210074 A | 7/2004 |
| WO | 2012063291 A1 | 5/2012 |
| WO | 2012066602 A1 | 5/2012 |

OTHER PUBLICATIONS

Japanese Patent Office, Office Action Issued in Japanese Patent Application No. 2013-551039, Mar. 31, 2015, 8 pages.
European Patent Office, Extended European Search Report Issued in Application No. 11878596.3, Aug. 31, 2015, Germany, 10 pages.

* cited by examiner

STRADDLE ELECTRIC VEHICLE

TECHNICAL FIELD

The present invention relates to a straddle vehicle such as an ATV (all terrain vehicle) or a motorcycle, and is a straddle electric vehicle which drives by driving power generated by an electric motor.

BACKGROUND ART

In recent years, a straddle electric vehicle which incorporates as a driving power source an electric motor activated by electric energy stored in a battery has been developed. In the straddle electric vehicle, it is necessary to incorporate a battery with a heavy weight, as compared to a conventional straddle vehicle which incorporates only an internal combustion engine as a driving power source (see e.g., Patent Literature 1).

CITATION LIST

Patent Literature

Patent Literature 1: Japanese Laid-Open Patent Application Publication No. 2004-210074.

SUMMARY OF INVENTION

Technical Problem

According to the disclosure of Patent Literature 1, the battery is placed above the electric motor. If the battery is increased in size to allow the vehicle to continue to drive in this layout, driving stability may be degraded.

Accordingly, an object of the present invention is to provide a straddle electric vehicle which can lower a center of gravity and continue to drive for a longer time.

Solution to Problem

The present invention has been developed to achieve the above object. According to the present invention, there is provided a straddle electric vehicle which drives by driving power generated by an electric motor, comprising: a battery case which accommodates a battery as an electric power supply for the electric motor, and is placed between a front wheel and a rear wheel; and a swing arm pivotably coupled at its front end portion to a vehicle body frame such that the swing arm supports the rear wheel by its rear end portion; wherein the electric motor is placed rearward relative to the battery case and forward relative to the rear wheel.

In accordance with this configuration, the electric motor is placed rearward relative to the battery case. Therefore, the battery case can be placed at a lowest possible position, the electric motor can be accommodated into a region between the front wheel and the rear wheel, and the center of gravity of the electric vehicle can be lowered. Since the battery is allowed to have a lower portion with an increased dimension, the capacity of the battery can be increased, and as a result, the electric vehicle can continue to drive for a longer time.

A rotary shaft of the electric motor may be placed above a pivot around which the swing arm is pivotable.

In accordance with this configuration, the electric motor is placed above the pivot of the swing arm. Therefore, even when the electric motor of a large size is mounted in the electric vehicle, the bank angle to which the vehicle body is allowed to be banked can be increased. This can suitably enhance both the output capability and turning capability of the electric vehicle.

A front end portion of the electric motor may be placed forward relative to the pivot.

In accordance with this configuration, the electric motor can be made as close to the battery as possible in the forward and rearward direction. This makes it possible to more easily concentrate these heavy components in the forward and rearward direction and enhance the turning capability of the electric vehicle.

The straddle electric vehicle may comprise a transmission mechanism which changes a speed of the driving power generated by the electric motor; and the transmission mechanism may be placed rearward relative to the battery case, the electric motor and the transmission mechanism may be arranged substantially vertically, and the electric motor may be placed above the transmission mechanism.

In accordance with this configuration, since the transmission mechanism is placed rearward relative to the battery case, the battery case can be placed at a lowest possible position, and is allowed to have a lower portion with an increased dimension. Thus, the electric motor placed rearward relative to the battery case and the transmission are arranged substantially vertically. This makes it possible to compactly lay out the components with heavy weights in the forward and rearward direction, and hence enhance the turning capability of the electric vehicle. Since the electric motor is placed above the transmission mechanism, the bank angle to which the vehicle body is allowed to be banked can be increased.

A rotary shaft of the electric motor may be placed rearward relative to an input shaft of the transmission mechanism.

In accordance with this configuration, since the electric motor is placed rearward relative to the transmission mechanism, the battery case can be placed to extend to a position that is as far rearward as possible.

The straddle electric vehicle may comprise a motor accommodating section accommodating the electric motor; and a transmission accommodating section accommodating the transmission mechanism; and a front end portion of the motor accommodating section may be placed rearward relative to a front end portion of the transmission accommodating section.

In accordance with this configuration, the battery case can be placed to extend to a position that is as far rearward as possible.

The vehicle body frame may include a first frame which extends rearward and downward from a head pipe and is joined to a front portion of the transmission accommodating section; and the battery case may be supported on the first frame in a state in which the battery case is mounted to the first frame.

In accordance with this configuration, it is not necessary to increase the stiffness of the battery case to an excessively high degree, as compared to a case where the battery case is suspended from the vehicle body frame. In addition, since the transmission accommodating section is joined to the first frame and serves as a portion of the vehicle body frame, the vehicle body structure can be simplified.

The vehicle body frame may include a second frame which is located above the first frame, extends rearward and downward from the head pipe, and is joined to a front portion of the motor accommodating section.

In accordance with this configuration, it becomes possible to realize a truss frame structure which couples the head pipe, the transmission accommodating section and the motor accommodating section, to each other, and enhance the stiffness of the vehicle body. Also, since the motor accommodating section serves as a portion of the vehicle body frame, the vehicle body structure can be simplified.

The second frame may be placed outward in a vehicle width direction relative to the battery case.

In accordance with this configuration, the side portion of the battery case can be protected by the second frame.

The pivot may be provided in the transmission accommodating section.

In accordance with this configuration, the transmission accommodating section can be used as a frame or a bracket for supporting the swing arm, and hence the number of components can be reduced. In addition, it becomes possible to realize a structure in which the electric motor and the motor accommodating section accommodating the electric motor are placed above the transmission and the pivot.

An input shaft of the transmission mechanism may be placed above the pivot; and the straddle electric vehicle may comprise a motor unit case including the motor accommodating section and the transmission accommodating section which are unitarily joined to each other; and the motor unit case may be configured as a portion of the vehicle body frame.

In accordance with this configuration, the motor unit case in which the motor accommodating section and the transmission accommodating section are arranged vertically serves as a portion of the vehicle body frame. This makes it possible to reduce the size of a frame member other than the motor unit case, for example, the length of the second frame or the seat frame.

An input shaft of the transmission mechanism may be placed below the pivot.

In accordance with this configuration, the transmission mechanism can be placed at a lowest possible position, and the center of gravity of the electric motorcycle can be lowered.

A lower end portion of the battery case may be placed below an input shaft of the transmission mechanism, and an upper end portion of the battery case may be placed above a rotary shaft of the electric motor.

In accordance with this configuration, the battery case can be placed at a lowest possible position, and the size of the battery can be increased as much as possible.

The straddle electric vehicle may comprise an oil passage through which oil used for cooling the electric motor flows; and an outlet of the oil passage may open above the transmission mechanism.

In accordance with this configuration, the oil which has flowed through the oil passage is dropped to the transmission mechanism and can lubricate the transmission mechanism. Therefore, the cooling system and the lubricating system in the electric motorcycle can be made compact.

The above and further objects, features and advantages of the invention will more fully be apparent from the following detailed description of a preferred embodiment, with reference to accompanying drawings.

Advantageous Effects of Invention

As should be appreciated from the above, in accordance with the present invention, it is possible to provide a straddle electric vehicle which can lower a center of gravity and continue to drive for a longer time.

DESCRIPTION OF EMBODIMENTS

Hereinafter, embodiments of the present invention will be described with reference to the accompanying drawings. Throughout the drawings, the same or corresponding components are designated by the same reference symbols and will not be described repeatedly in detail. The stated directions are referenced from the perspective of a rider riding on an electric motorcycle which is an exemplary straddle electric vehicle according to the embodiment of the present invention.

Figure 1:
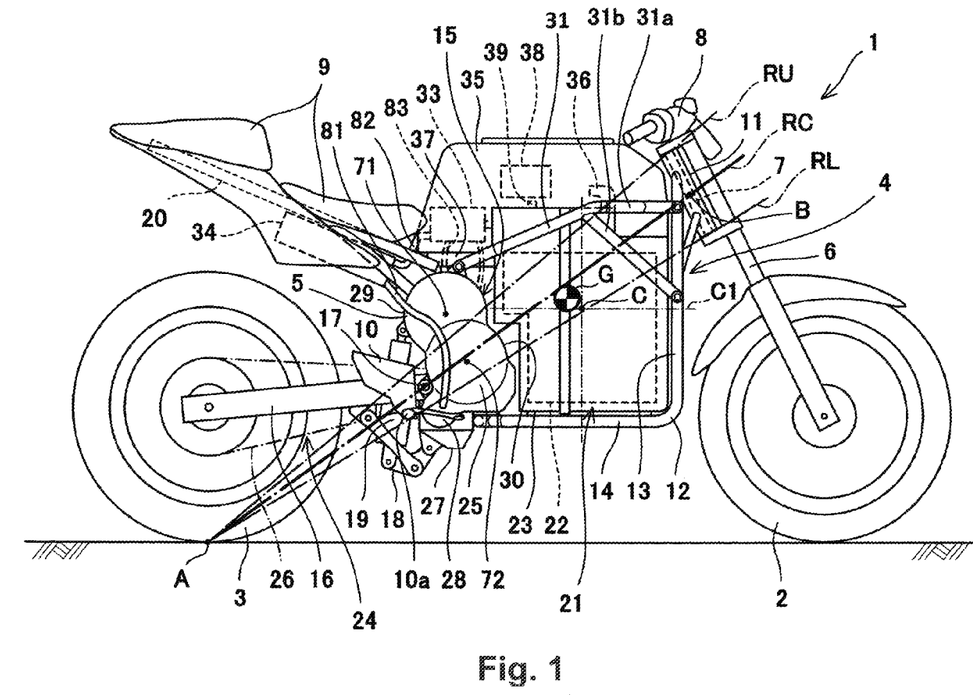
FIG. 1 is a right side view of an electric motorcycle which is an exemplary straddle electric vehicle according to Embodiment 1 of the present invention.

FIG. 1 is a right side view of an electric motorcycle 1 which is an exemplary straddle electric vehicle according to Embodiment 1 of the present invention. As shown in FIG. 1, the electric motorcycle 1 includes a front wheel 2 which is a driven wheel, a rear wheel 3 which is a drive wheel, a vehicle body frame 4 disposed between the front wheel 2 and the rear wheel 3, and an electric motor 5 which is a driving power source for moving the electric motorcycle 1. The electric motorcycle 1 of the present embodiment is not equipped with an internal combustion engine and is configured to rotate the rear wheel 3 by driving power generated by the electric motor 5. In the electric motorcycle 1 of the present embodiment, a driving power transmission mechanism 24 for transmitting the driving power of the electric motor 5 to the rear wheel 3 includes a transmission 25.

The electric motorcycle 1 includes a motor unit case 15 including a motor accommodating section 29 accommodating the electric motor 5 and a transmission accommodating section 30 accommodating the transmission 25 such that the motor accommodating section 29 and the transmission accommodating section 30 are unitarily joined together. In other words, the motor unit case 15 accommodates the electric motor 5 and the transmission 25. The electric motor (or motor accommodating section 29) is positioned above the transmission 25 (or transmission accommodating section 30). The motor unit case 15 is elongated in a direction in which the motor accommodating section 29 and the transmission accommodating section 30 are arranged. As a result, the motor unit case 15 is mounted in the electric motorcycle such that it extends vertically.

The motor accommodating section 29 is provided in the upper portion of the motor unit case 15, while the transmission accommodating section 30 is provided in the lower portion of the motor unit case 15. The bottom portion of the motor unit case 15 constitutes an oil pan 27 for reserving oil. The oil is used as a coolant for cooling the electric motor 5 and an inverter 33 and as a lubricant for lubricating the electric motor 5 and sliding sections of the transmission 25. The motor unit case 15 also accommodates an oil pump 28 which discharges the oil reserved in the oil pan 27. The oil pump 28 is placed between the transmission 25 and the oil pan 27 in a vertical direction.

The front wheel 2 is rotatably mounted to the lower portion of a front fork 6 extending substantially vertically. A steering shaft 7 for steering the front wheel is coupled to the upper portion of the front fork 6, and a handle 8 is attached to the upper portion of the steering shaft 7.

The vehicle body frame 4 includes a head pipe 11, main frames 12 (first frame) and sub-frames 31 (second frame). The steering shaft 7 is supported by the head pipe 11 such that the steering shaft 7 is rotatable. The main frames 12 are unitarily joined to the head pipe 11 such that the main frames 12 extend rearward and downward from the head pipe 11. The main frames 12 include down frame members 13 extending downward from the head pipe 11 and lower frame members 14 extending rearward from the lower ends of the down frame members 13. The rear end portions of the lower frame members 14 are detachably joined to the front portion of the transmission accommodating section 30. The sub-frames 31 extend rearward and downward from the upper portion of the head pipe 11 or the upper portions of the main frames 12. The sub-frames 31 include a pair of right and left first sub-frame members 31a extending rearward from the upper end portions of the down frame members 13, and a pair of right and left second sub-frame members 31b coupling the first sub-frame members 31a to the vertically intermediate portions of the down frame members 13. The front end portions of the first sub-frame members 31a are detachably joined to the down frame members 13, respectively, by bolts. The rear end portions of the first sub-frame members 31a are detachably joined to the upper portion of the motor accommodating section 29, by bolts. The upper end portions of the second frame members 31b are welded to the first frame members 31a, respectively. The lower end portions of the second frame members 31b are detachably joined to the down frame members 13 by bolts.

As described above, the motor unit case 15 is joined to the main frames 12 and the sub-frames 31 and are constructed as a portion of the vehicle body frame 4. This can simplify a vehicle body structure. In addition, it becomes possible to realize a truss frame structure which couples the head pipe 11, the motor accommodating section 29 and the transmission accommodating section 30, to each other. In this frame structure, the motor unit case 15 serves as a portion of the vehicle body frame 4 which unitarily joins the motor accommodating section 29 and the transmission accommodating section 30 to each other. Because of this, the vehicle body structure can be simplified while increasing a vehicle body stiffness.

A swing arm 16 is pivotably coupled to the motor unit case 15. The swing arm 16 extends in a forward and rearward direction. The swing arm 16 is pivotably coupled at its front end portion to the rear portion of the motor unit case 15 and supports the rear wheel 3 by its rear end portion such that the rear wheel 3 is rotatable. The motor unit case 15 has a flange protruding rearward from the rear portion thereof. A pivot 17 around which the swing arm 16 is pivotable is oriented in a rightward or leftward direction so as to penetrate the flange. In this way, in the present embodiment, the motor unit case 15 serves as a swing arm bracket or a pivot frame for supporting the swing arm 16 such that the swing arm 16 is pivotable. The motor unit case 15, the electric motor 5 accommodated in the motor unit case 15, etc., are components in the vehicle body frame 4 which are angularly displaced with respect to the swing arm 16.

A link mechanism 18 which operates in response to the pivot motion of the swing arm 16 is provided between the lower portion of the swing arm 16 and the bottom portion (in the present embodiment, oil pan 27) of the motor unit case 15. The lower end portion of a rear suspension 19 is coupled to the link mechanism 18 such that the rear suspension 19 is pivotable. The upper end portion of the rear suspension 19 is coupled to the rear portion of the motor unit case 15 such that the rear suspension 19 is pivotable. In this way, the motor unit case 15 also serves as a fastening suspension bracket for mounting the end of the rear suspension 19 to the vehicle body frame 4.

The motor unit case 15 is also joined to a seat frame 20. The seat frame 20 is detachably joined to the motor unit case 15, and extends rearward from the upper portion of the motor unit case 15 such that it is inclined upward. A seat 9 on which the rider and a passenger are seated in the forward and rearward direction is mounted to the seat frame 20. The electric motorcycle is a straddle vehicle. The rider is seated on the seat 9 while straddling a vehicle body. A pair of foot steps 10a attached to a pair of step brackets 10 are placed rearward relative to the motor unit case 15. The rider seated on the seat 9 while straddling the vehicle body puts the rider's right and left foot soles on the pair of foot steps 10a, respectively.

Figure 3:
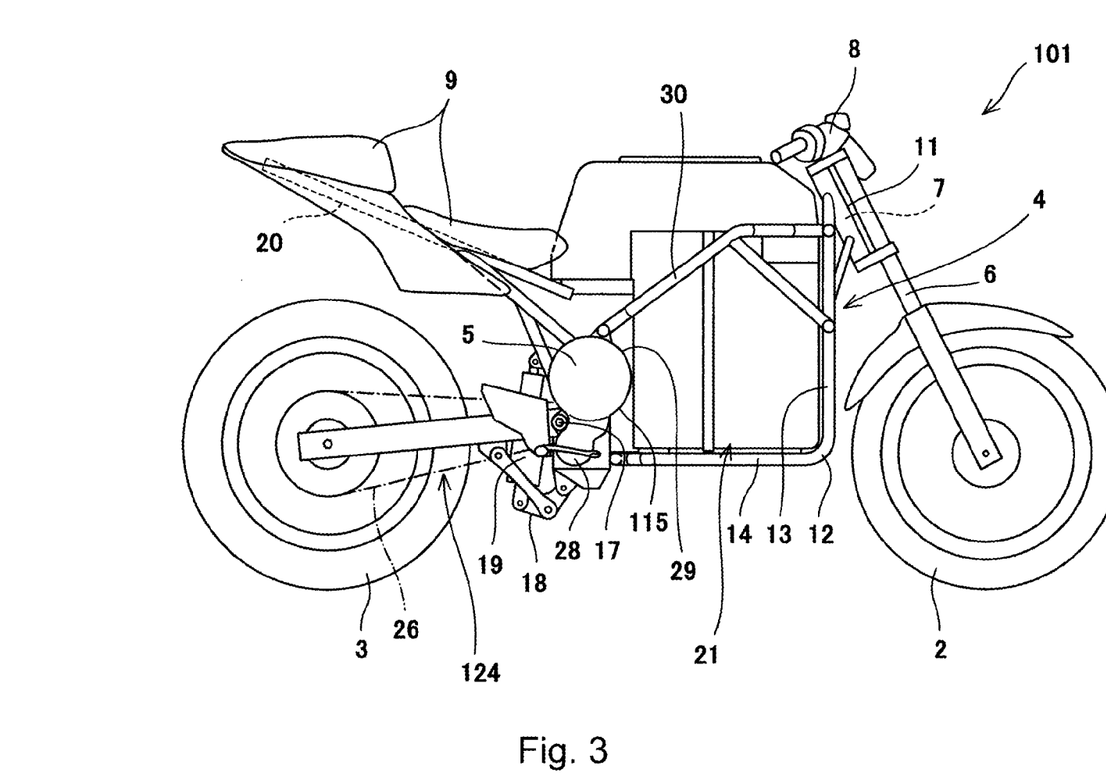
FIG. 3 is a right side view of an electric motorcycle which is an exemplary straddle electric vehicle according to Embodiment 2 of the present invention.

The electric motorcycle 1 incorporates a battery unit 21 as an electric power supply for the electric motor 5. The battery unit 21 includes a battery 22 for storing DC power, and a battery case 23 accommodating the battery 22. The battery case 23 is supported on the lower frame members 14 of the main frames 12. The inverter 33 converts the DC power stored in the battery 22 into AC power. The electric motor 5 is activated by the AC power supplied from the inverter 33 to generate the driving power for moving the vehicle body. To realize this electric action, the battery 22 is mechanically and electrically connected to the inverter 33 via a wire 33a (only the wire is shown in FIG. 1, and reference symbol is shown in FIG. 3) through which a high-voltage DC current flows, while the inverter 33 is mechanically and electrically connected to the electric motor 5 via a wire 33b (only the wire is shown in FIG. 1, and reference symbol is shown in FIG. 3) through which an AC current flows. The driving power generated by the electric motor 5 is transmitted to the rear wheel 3 via a driving power transmission mechanism 24. This allows the rear wheel 3 to rotate. As a result, the electric motorcycle 1 can drive. As described above, the driving power transmission mechanism 24 includes the transmission 25 and a chain 26. The transmission 25 changes the speed of the rotation of a rotary shaft 71 of the electric motor 5. The chain 26 transmits the rotation with the changed speed, to the rear wheel 3.

The battery case 23 is placed between the front wheel 2 and the rear wheel 3. More specifically, the battery case 23 is placed forward relative to the motor unit case 15 and rearward relative to the down frame members 13 of the main frames 12. Since the motor unit case 15 is coupled to the front end portion of the swing arm 16, it is placed forward relative to the rear wheel 3. Because of this, the motor unit case 15 (i.e., electric motor 5 and transmission 25) extending vertically is placed rearward relative to the battery case 23 and forward relative to the rear wheel 3. This makes it possible to accommodate the electric motor 5 and the battery 22 between the front wheel 2 and the rear wheel 3 and lower the center of gravity of the electric motorcycle to a lowest possible position.

The battery case 23 is supported on the main frames 12 such that it is placed on the lower frame members 14 of the main frames 12. In this structure, it is not necessary to increase the stiffness of the battery case 23 to an excessively high degree, as compared to a case where the battery case 23 is suspended from the vehicle body frame 4. Furthermore, the pair of right and left sub-frames 31 are placed outward relative to the battery case 23 in a vehicle width direction. This allows the side portions of the battery case 23 to be protected by the sub-frames 31. For example, even when the electric motorcycle falls down, the sub-frames 31 can suppress damages to the battery case 23.

Figure 2:
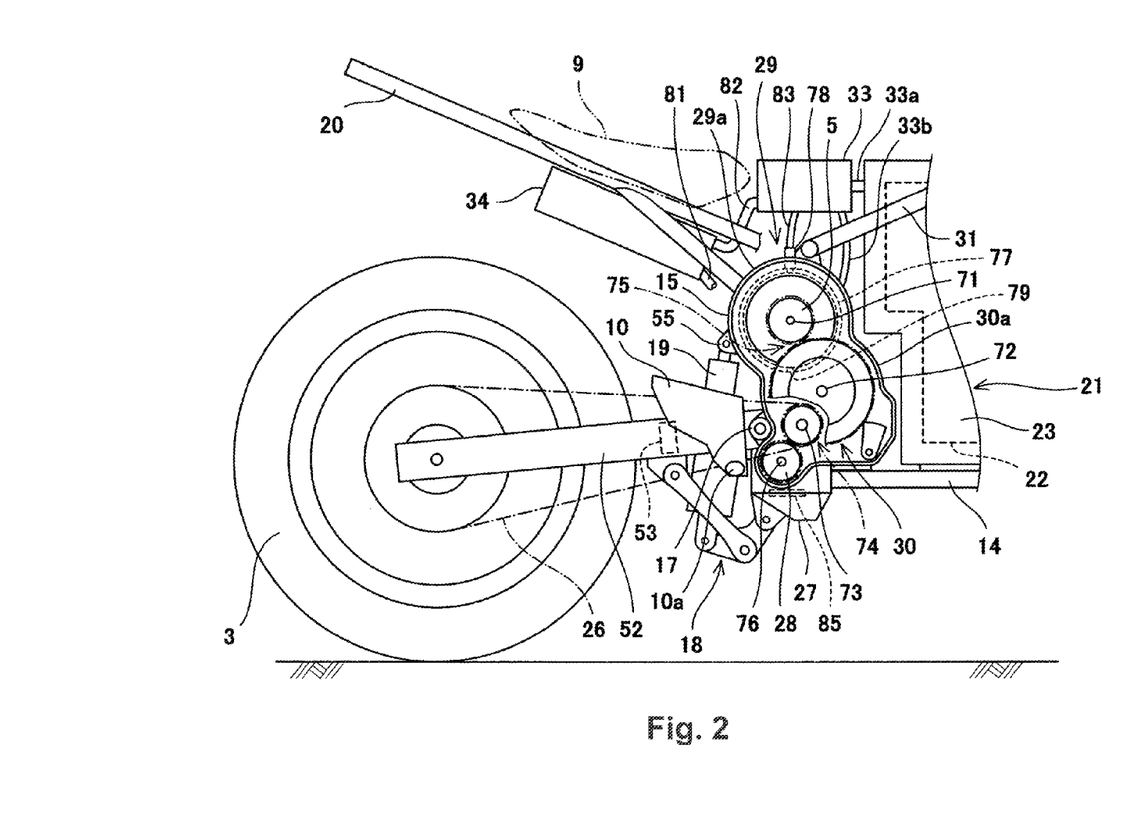
FIG. 2 is a right side view showing a region surrounding a motor unit case of the electric motorcycle of FIG. 1.

FIG. 2 is a right side view showing a region surrounding the motor unit case 15 of FIG. 1. In FIG. 2, the motor unit case 15 is shown in a state in which a motor cover covering the right portion of the motor unit case 15 is detached. As shown in FIG. 2, the electric motor 5 is placed rearward relative to the battery case 23 and forward relative to the rear wheel 3. This allows the battery case 23 to be placed to a lowest possible position and the center of gravity of the motorcycle to be lowered. In addition, the battery case 23 is allowed to have a lower portion with an increased dimension. Therefore, the capacity of the battery 22 can be increased, which will allow the electric motorcycle to continue to drive for a longer time.

Even when the electric motor 5 is increased in size, the bank angle to which the vehicle body is allowed to be banked can be increased. If an attempt is made to increase the size of the electric motor 5, the electric motor 5 is increased in dimension in an axial direction as well as in a radial direction. By comparison, during turning of the electric motorcycle 1, the vehicle body is typically banked against the centrifugal force exerted on the vehicle body. If the electric motor 5 with a large size is placed in an unnecessarily low position, the electric motor 5 is likely to contact the road surface when the vehicle body is banked. This reduces the bank angle to which the vehicle body is allowed to be banked and degrades a turning capability of the electric motorcycle. To avoid this, in the present embodiment, the rotary shaft 71 of the electric motor 5 is positioned above the pivot 17. This can increase the bank angle to which the vehicle body is allowed to be banked even though the electric motor 5 with a large size is mounted in the electric motorcycle. This can suitably enhance both the output capability and turning capability of the electric motorcycle. Especially, since the entire electric motor 5 is placed above the pivot 17, the output capability and turning capability of the electric motorcycle can be easily enhanced.

Furthermore, the electric motor 5 and the transmission 25 are arranged vertically. This makes it possible to compactly lay out the components with heavy weights in a forward and rearward direction, and to prevent the components with great weights from being dispersed in the forward and rearward direction. Moreover, the electric motor 5 is placed above the transmission 25. This makes it easier to enhance the output capability and turning capability of the electric motorcycle.

The front end portion of the motor accommodating section 29 is positioned forward relative to the pivot 17. Especially, in the present embodiment, since the rotary shaft 71 of the electric motor 5 is positioned forward relative to the pivot 17, more than half of the motor accommodating section 29 in the forward and rearward direction is positioned forward relative to the pivot 17. This allows the electric motor 5 to be as close to the battery 22 as possible in the forward and rearward direction. As a result, it becomes possible to more easily concentrate the components with great weights in the forward and rearward direction.

The pivot 17 is provided on the rear surface of the transmission accommodating section 30 accommodating the transmission 25. Because of this, the motor unit case 15 can serve as the swing arm bracket or the pivot frame, and the electric motor 5 can be placed above the pivot 17, and the front end portion of the motor accommodating section 29 can be placed forward relative to the pivot 17.

The structure of the motor unit case 15 will be described in more detail. The motor accommodating section 29 has a peripheral wall 29a enclosing the electric motor 5. The peripheral wall 29a is expressed as a drawing of a circular-arc, the center of which is the rotary shaft 71 of the electric motor 5, when viewed from a side. The transmission 25 includes an input shaft 72 to which the rotation of the rotary shaft 71 of the electric motor 5 is transmitted, an output shaft 73 to which the rotation of the input shaft 72 is transmitted, and a plurality of change gear trains 74 which change the speed of the rotation of the input shaft 72 and transmit the rotation with a changed speed to the output shaft 73. The motor unit case 15 accommodates a primary reduction gear mechanism 75 for transmitting the rotation of the rotary shaft 71 of the electric motor 5 to the input shaft 72 of the transmission 25, together with the electric motor 5 and the transmission 25. The transmission accommodating section 30 has a peripheral wall 30a enclosing the primary reduction gear mechanism 75 and the transmission 25. A portion of the peripheral wall 30a is expressed as a drawing of a circular-arc, the center of which is the input shaft 72, when viewed from a side. The peripheral wall 29a of the motor accommodating section 29 is continuous with the peripheral wall 30a of the transmission accommodating section 30, so that the entire peripheral wall of the motor unit case 15 has a gourd shape in which two circular-arcs are vertically continuous.

The electric motor 5 is placed above the transmission 25. The rotary shaft 71 of the electric motor 5 is placed above the input shaft 72 of the transmission 25. The rotary shaft 71 of the electric motor 5 is placed rearward relative to the input shaft 72 of the transmission 25. Therefore, the motor accommodating section 29 is placed rearward relative to the transmission accommodating section 30. As a result, the motor unit case 15 extends vertically such that it is inclined rearward from its lower end toward its upper end.

In the above structure, the rear end portion of the motor accommodating section 29 is placed rearward relative to the rear end portion of the transmission accommodating section 30. As described above, the rear portion of the transmission accommodating section 30 is provided with the flange which the pivot 17 penetrates. In contrast, the rear portion of the motor accommodating section 29 is provided with a flange 55 to which the upper end portion of a rear suspension 19 extending vertically is fastened. The flange 55 protrudes rearward from the motor accommodating section 29. Since the rear end portion of the transmission accommodating section 30 is placed forward relative to the rear end portion of the motor accommodating section 29, the amount of the protruding portion of the flange 55 can be lessened, and a supporting stiffness can be enhanced. Furthermore, it becomes possible to prevent the axially intermediate portion of the rear suspension 19 from interfering with the rear portion of the transmission accommodating section 30.

The rear suspension 19 extends vertically. In more detail, the rear suspension 19 is inclined forward as it extends upward. The rear suspension 19 crosses the swing arm 16 when viewed from a side. The lower end portion of the rear suspension 19 is positioned below the swing arm 16. In this structure, the center of gravity of the electric motorcycle can be lowered, and thereby there is formed a space above the swing arm 16, in which another component is placed. In the present embodiment, a radiator 34 is placed in the space above the swing arm 16. In a motorcycle incorporating an engine, exhaust system components are typically laid out in a space of the lower portion of the motorcycle. However, in the electric motorcycle, the exhaust system components can be omitted. In light of this, the lower end portion of the rear suspension 19 is placed in a space below the swing arm 16. The link mechanism 18 is efficiently placed in the same manner.

As an example of the structure which allows the rear suspension 19 and the swing arm 16 to cross each other such that they do not interfere with each other, in the present embodiment, the swing arm 16 is formed in an H-shape when viewed from above. In other words, the swing arm includes a pair of right and left arm members 52 and a cross member 53 coupling together the right and left intermediate portions of the pair of arm members 52 in the forward and rearward direction. The rear suspension 19 is vertically inserted through an opening surrounded by the pair of arm members 52 of the swing arm 16, the cross member 53 and the rear end surface of the motor unit case 15. In this layout, the lower end portion of the rear suspension 19 can be placed below the swing arm 16, and the upper end portion of the rear suspension 19 can be fastened to the motor accommodating section 29. In addition, the rear suspension 19 extending vertically is close to the rear surface of the motor unit case 15. Therefore, the components with heavy weights can be concentratively arranged and hence the turning capability of the electric motorcycle can be improved. In addition, since the front side of the rear suspension 19 is covered with the motor unit case 15, the rear suspension 19 can be protected from muddy water splashing from forward.

As described above, the motor accommodating section 29 and the transmission accommodating section 30 are placed rearward relative to the battery case 23, the battery case 23 is supported on the lower frame members 14 of the main frames 12, and the lower frame members 14 are joined to the front end portion and lower end portion of the transmission accommodating section 30. Because of this layout, the front end portion of the transmission accommodating section 30 faces the rear surface of the battery case 23 in the forward and rearward direction, and the front end portion of the motor accommodating section 29 also faces the rear surface of the battery case 23 in the forward and rearward direction.

In the present embodiment, the front end portion of the motor accommodating section 29 is placed rearward relative to the front end portion of the transmission accommodating section 30. The rear upper portion of the battery case 23 protrudes rearward farther than the rear lower portion thereof. This allows the lower portion of the rear surface of the battery case 23 to be close to the front end portion of the transmission accommodating section 30 and the upper portion of the rear surface of the battery case 23 to be close to the front end portion of the motor accommodating section 29. Therefore, the transmission 25 is located rearward relative to the battery 22 and close to the battery 22, and the electric motor 5 placed rearward relative to the transmission 25 is located rearward relative to the battery 22 and close to the battery 22. Since the battery 22 and the battery case 23 are placed to extend to a position that is as far rearward as possible, the capacity of the battery 22 can be increased.

By placing the motor accommodating section 29 at the upper side in a rearward position, the battery case 23 is provided with a portion protruding rearward. Because of this, even in a state in which the motor unit case 15 is mounted to the main frames 12, and the swing arm 16, the link mechanism 18, the rear suspension 19, the seat frame 20, and others are mounted to the motor unit case 15, the battery case 23 can be placed on the lower frame members 14 or moved away from the lower frame members 14 merely by moving the battery case 23. Therefore, the battery case 23 can be easily mounted into the electric motorcycle or can be easily detached therefrom.

Especially, in the present embodiment, the sub-frames 31 are detachably joined to the vehicle body frame 4 and the motor unit case 15. Therefore, in a state in which the sub-frames 31 are detached, the battery unit 21 can be disengaged from the vehicle body and can be mounted to the vehicle body from outside merely by raising the battery unit 21 to a position which is almost as high as the upper end portion of the motor unit case. If the battery unit 21 is slid in a rightward or leftward direction to be mounted to the vehicle body frame, it has only to be raised to a position which is slightly higher than the upper surface of the lower frame members 14. Furthermore, the dimension of the portion of the battery case 23, in the rightward or leftward direction, which is not covered with the sub-frames 31, is not restricted by a spacing between the sub-frames 31 facing each other. Therefore, the size of the battery case 23 can be easily increased and the electric motorcycle can continue to drive for a longer time. In the present embodiment, a region of the battery case 23, which is below than the sub-frames 31, is greater than a region of the battery case 23, which is above than the sub-frames 31. Therefore, the electric motorcycle can continue to drive for a longer time and the center of gravity of the electric motorcycle can be lowered.

Since the rear end portions of the lower frame members 14 are joined to the lower end portion of the transmission accommodating section 30, the lower end portion of the battery case 23 can be placed below the input shaft 72 of the transmission 25. The upper end portion of the battery case 23 is placed above the rotary shaft 71 of the electric motor 5. In this way, the battery case 23 is allowed to have a large height while placing the battery case 23 in a lowest possible position. This can increase the capacity of the battery 22. Therefore, the electric motorcycle can continue to drive for a longer time.

The motor unit case 15 accommodates an oil pump 28 in a region between the transmission 25 and the oil pan 27. A rotary shaft 76 of the oil pump 28 is placed below the pivot 17. More specifically, the rotary shaft 76 of the oil pump 28 is placed between the pivot 17 and the output shaft 73 of the transmission 25 in the forward and rearward direction and below these two shafts 17, 73. The oil pump 28 may be a mechanical pump activated by the electric motor 5. In this case, the motor unit case 15 may accommodate a mechanism for transmitting the rotation of the transmission 25 to the rotary shaft 76. Alternatively, the oil pump 28 may be an electric pump. Or, both the mechanical oil pump and the electric oil pump may be provided. In this case, even in a state in which the electric motor 5 is stopped and the mechanical oil pump is inoperative, the oil can be fed to the components to be cooled or lubricated by using the electric oil pump.

The dimension of the electric motor 5 in the rightward and leftward direction may be increased to provide a greater output capability, but is smaller than the dimension of the battery unit 21 in the rightward or leftward direction, which tends to be large to allow the electric motorcycle to continue to drive for a longer time. Also, in the straddle vehicle, the region below and in front of the seat 9 is sandwiched between the rider's legs (knees or thighs) during driving. Accordingly, in the present embodiment, the electric motor 5 is placed close to the seat 9, below the seat 9, and in front of the seat 9. The battery unit 21 is placed forward relative to the electric motor 5, and is more distant from the seat 9 than the electric motor 5 is. Since the seat 9, the electric motor 5, and the battery unit 21 are placed in this way, the rider can more easily sandwich the vehicle body with the knees and a driving load which occurs during driving can be lessened, as compared to a case where the battery unit 21 is placed close to the seat 9.

As described above, in the present embodiment, because of the above described layout of the battery case 23, the motor unit case 15, etc., the battery case 23 can be placed at a lower position and thus, the center of gravity of the electric motorcycle can be lowered. To lower the center of gravity of the electric motorcycle, the lower end portion of the battery case 23 or the lower end portion of the battery 22 is preferably positioned below the rotary shaft 71 of the electric motor 5.

More preferably, the lower end portion of the battery case 23 or the lower end portion of the battery 22 is positioned as high as or lower than the lower end portion of the motor accommodating section 29.

Turning back to FIG. 1, when viewed from a side, a straight line connecting a ground point A of the rear wheel 3 to the center of the head pipe 11 is expressed as a roll axis RC. The electric motor 5 is placed on the roll axis RC. In the present embodiment, the rotary shaft 71 of the electric motor 5, the input shaft 72 and the output shaft 73 of the transmission 25 are close to the roll axis RC. The roll axis RC extends through a region between the rotary shaft 71 of the electric motor 5 at an upper side and the input shaft 72 of the transmission 25 at a lower side. By comparison, the battery 22 is placed forward relative to the electric motor 5 such that the battery 22 faces the electric motor 5. This allows the center of gravity G of the entire vehicle body to be positioned below the roll axis RC. As a result, the electric motorcycle can stably drive straight ahead.

In the present embodiment, the upper end of the rear portion of the battery unit 21 is placed above the roll axis RC. Likewise, the upper end of the rear portion of the motor accommodating section is placed above the roll axis RC. This makes it possible to prevent the center of gravity G from being located much lower than the roll axis RC. The battery unit 21 is preferably placed and formed such that the center of gravity G is located above the vertical center line C1 of the battery unit 21. This makes it possible to prevent the center of gravity from being lowered in excess. More specifically, the center of gravity G is set above the center C in a vertical direction and rearward relative to the center C in the forward and rearward direction such that the center of gravity G is closer to the roll axis RC than the center C of the battery unit 21 in the vertical direction and in the forward and rearward direction is. In the present embodiment, the upper portion of the battery unit 21 protrudes rearward relative to the lower portion of the battery unit 21. This allows the center of gravity G to be suitably located above and rearward relative to the center of the battery unit 21 in the vertical direction and in the forward and rearward direction. Note that the roll axis RC may be set in an area between roll boundaries RU, RL extended from the ground point A of the rear wheel 3 to the upper end and lower end of the head pipe 11, respectively.

The upper portion of the battery case 23 is covered with an air box 35. Since the battery case 23 is placed at a lowest possible position, there is an extra space in the upper portion of the space between the front wheel 2 and the motor unit case 15. The air box 35 can be placed in this extra space. Since the battery case 23 is covered with the air box 35 from above, it becomes possible to suppress entry of rain water into the battery case 23.

An intake duct 36 is attached to the upper portion of the battery case 23. A discharge duct 37 is coupled to the rear portion of the battery case 23. The intake duct 36 and the discharge duct 37 open in the interior of the air box 35. The air box 35 is able to take in ram air from forward. The air taken into the air box 35 is sent to the battery case 23 via the intake duct 36, flows rearward in the interior of the battery case 23 and is discharged to the interior of the air box 35 via the discharge duct 37. This allows the battery 22 inside the battery case 23 to be suitably cooled by the air. Even in a case where the ram air contains a moisture, the moisture can be captured in the interior of the air box 35, which makes it possible to suppress ingress of the moisture into the battery case 23. The intake duct 36 extends upward from the upper portion of the battery case 23. The inlet of the intake duct 36 is located in a space in the interior of the air box 35. To capture the moisture more effectively, there may be formed a labyrinth structure between an opening though which the ram air is introduced and the inlet of the intake duct 36, in the interior of the air box 35.

The inner space of the air box 35 can be utilized as the space in which electric components 38 are placed. By protruding a terminal 39 connected to the battery 22 from the upper portion of the battery case 23, the electric components 38 inside the air box 35 can be easily connected to the battery 22. The electric components 38 may include a charging connector connectable to an outside electric power supply to charge the battery 22. In this case, a portion of the outer wall of the air box 35 is configured to be openable and closable. Note that the inner space of the air box 35 may be utilized as a space in which articles of the rider are accommodated, in addition to or instead of the space in which the electric components 38 are accommodated.

The rear portion of the air box 35 protrudes rearward farther than the rear wall of the battery case 23. By comparison, the rear portion of the bottom wall of the air box 35 is located below the rear portion of the upper wall of the battery case 23. The upper portion of the rear wall of the battery case 23 constitutes a stepped portion connecting the rear portion of the bottom portion of the air box 35 to the rear portion of the upper wall of the battery case 23. The inverter 33 is accommodated in the rear portion in the interior of the air box 35 and located close to the stepped portion.

The electric motor 5, the battery 22, and the inverter 33 are placed close to each other. Wires 33a, 33b (see FIG. 2) are placed within a space surrounded by case members which accommodate these individual components (in the present embodiment, the motor accommodating section 29 of the motor unit case 15, the rear portion of the air box 35 and the battery case 23).

The inverter 33 is placed between the seat 9, and the battery 22 and the electric motor 5. In the present embodiment, when viewed from a side, a U-shaped space is defined by the front end portion of the seat, the rear portion of the battery and the upper portion of the electric motor. The inverter 33 is accommodated into this space. This makes it possible to prevent the inverter 33 from contacting some obstacles. In addition, the wires 33a, 33b (see FIG. 2) connecting them can be protected by the seat 9, the battery 22 and others.

More specifically, the rear portion of the air box 35 is sandwiched between the seat 9 and the rear upper portion of the battery case 23, and is close to the seat 9 and the rear upper portion of the battery case 23. The rear portion of the air box 35 is located above the motor unit case 15 and is close to the motor unit case 15 in the vertical direction. The motor unit case 15 is located rearward relative to the battery case 23 and is close to the rear portion of the battery case 23 in the forward and rearward direction. The upper portion of the motor unit case 15 constitutes the motor accommodating section 29 accommodating the electric motor 5. The battery case 23 accommodates the battery 22, while the rear portion of the air box 35 accommodates the inverter 33.

Because of the above described structure and layout, as shown in FIG. 2, the inverter 33 is placed rearward relative to and close to the battery 22, and the electric motor 5 is placed below and close to the inverter 33. This reduces the wires 33a, 33b in length. The layout of the wires 33a, 33b becomes compact and a work for connecting the wires 33a, 33b can be carried out easily. It is necessary to draw the wire 33a out of the battery case 23 and connect it to the inverter 33.

The inverter 33 is provided close to the upper portion (stepped portion) of the rear wall of the battery case 23. Accordingly, the stepped portion has an opening (not shown)

into which the wire 33a is inserted. This allows the entire wire 33a to be accommodated into the battery case 23 and the air box 35 (see FIG. 1). The battery case 23 is manufactured using a material having an insulativity. At least the rear portion of the air box 35 (see FIG. 1) is also manufactured using a material having an insulativity. This means that the battery 22 and the inverter 33 are accommodated into different insulative components, respectively. This makes it possible to prevent a situation in which a short circuit is undesirably formed between the battery 22 and the inverter 33. In addition, the wire 33a is accommodated in these insulative components. Therefore, even when the inverter 33 is placed close to the seat 9, it becomes possible to prevent a situation in which the rider touches the wire 33a through which a current with a great magnitude flows. The wire 33b connecting the inverter 33 to the electric motor 5 is placed in a narrow space between the bottom portion of the air box 35 (see FIG. 1) and the upper portion of the motor unit case 15. Therefore, it becomes possible to prevent a situation in which the rider touches the wire 33b. The layout in which the wire 33b is closer to the center in the vehicle width direction than to the sub-frames 31, provides an advantage, because the rider cannot easily access the wire 33b.

Turning back to FIG. 1, the inverter 33 and the electric motor 5 are cooled by the oil reserved in the oil pan 27. The members of the electric motor 5 and the members of the transmission, which are to be lubricated, are lubricated by the oil reserved in the oil pan 27. That is, in the electric motorcycle 1, a cooling system and a lubricating system are integrated. As described above, the electric motorcycle 1 is provided with the oil pump to discharge the oil. The oil pump 28 is accommodated into the motor unit case 15. The electric motorcycle 1 is provided with the radiator 34 for cooling the oil by heat exchange with the ram air. In the present embodiment, the radiator 34 is mounted to the reverse side of the seat frame 20, and placed in the space formed above the swing arm 16 by placing the rear suspension 16 at a lowest possible position. This space is placed rearward relative to the electric motor 5, and located forward relative to and above the rear wheel 3. Since the radiator 34 is placed above the rear wheel 3, it is distant from the ground surface and is less likely to receive radiation heat from the ground surface. As a result, the cooling capability of the oil can be enhanced.

In the present embodiment, the oil pump is connected to the radiator 34 via a pipe 81, the radiator 34 is connected to the inverter 33 via a pipe 82, and the inverter 33 is connected to the motor unit case 15 via a pipe 83. The oil pump 28 feeds the oil with a pressure to the radiator 34 via the pipe 81. The pipe 81 extends upward from a region in the vicinity of the rotary shaft of the oil pump 28, in a location which is lateral relative to the motor unit case 15. The oil which has been cooled by the radiator 34, is fed to the inverter 33 via the pipe 82. The pipe 82 extends forward through a space between the seat frames 20 and into the air box 35 through the rear lower portion. In the inverter 33, the oil exchanges heat with the inverter 33 and raises its temperature. This causes the inverter 33 to be cooled. The oil discharged from the inverter 33 is sent to the motor unit case 15 via the pipe 83. The pipe 83 extends downward from the inverter 33 and is connected to the upper portion of the motor unit case 15. Because the seat frame 20, the radiator 34 mounted to the seat frame 20, the electric motor 5, the motor unit case 15 accommodating the electric motor, and the inverter, are placed close to each other, the pipes 81 to 83 can be reduced in length.

Turning back to FIG. 2, an oil passage 77 is provided in the interior of the motor unit case 15 by utilizing the wall surface of the motor unit case 15 such that the oil passage 77 surrounds the electric motor 5. Especially, in the present embodiment, the oil passage 77 surrounds heat generation members of the electric motor 5, for example, coils and a stator.

An inlet 78 is provided at the upper end portion of the oil passage 77, and an outlet 79 is provided at the lower end portion of the oil passage 77. The inlet 78 opens in the upper end portion of the motor unit case 15. The downstream end portion of the pipe 83 is connected to the inlet 78. In the present embodiment, the inverter 33 is placed above the motor unit case 15 (i.e., electric motor 5). This allows the pipe 83 to extend substantially vertically. Therefore, the oil can be fed from the inverter 33 to the electric motor 5 by its own weight.

The oil flowing from the inverter 33 flows into the oil passage 77, flows downward within the oil passage 77 by its own weight, flows out through the outlet 79 and is dropped. While flowing through the oil passage 77, the oil exchanges heat with the heat generation members (e.g., coils) of the electric motor 5 and raises its temperature, and thereby the electric motor 5 is cooled. The transmission 25 is placed below the electric motor 5 and the oil pan 27 is placed below the transmission 25. The outlet 78 opens above the transmission 25. The oil dropped through the outlet 78 is returned to the oil pan via the transmission 25. While the oil is returned to the oil pan via the transmission 25, gears of the transmission 25 are lubricated. By arranging the electric motor 5 and the transmission 25 vertically in this way, in a case where the coolant of the electric motor 5 is used as the lubricant of the transmission 25, the lubricant can be guided to the transmission 25 and returned to the oil pan 27 by its own weight, and the oil passage which accomplishes this can be easily formed by utilizing the wall surface of the motor unit case 15.

Since the oil pan 27 constitutes the bottom portion of the motor unit case 15 and the oil pump 28 is accommodated into the motor unit case 15, the oil passage can be further formed in the motor unit case 15, and the lubricating system and the cooling system can be configured compactly. A filter 85 is placed between the oil pump 28 and the oil pan 27. The oil pump 28 feeds to the radiator 34 the oil which has flowed through the filter 85. This makes it possible to prevent a situation in which abrasion powder generated in the transmission 25 enters the radiator 34, the inverter 33, and the electric motor 5.

FIG. 3 is a right side view of an electric motorcycle 101 which is an exemplary straddle electric vehicle according to Embodiment 2 of the present invention. Hereinafter, regarding Embodiment 2, differences from Embodiment 1 will be mainly described. As shown in FIG. 3, the electric motorcycle 101 according to the present embodiment is configured such that a driving power transmission mechanism 124 for transmitting the driving power generated by the electric motor to the rear wheel 3 does not incorporate a transmission. Therefore, a motor unit case 115 includes the motor accommodating section 29 accommodating the electric motor 5, but does not include a transmission accommodating section, differently from Embodiment 1. The rear lower portion of the motor accommodating section 29 is provided with a flange protruding rearward. The front end portion of the swing arm 16 is coupled to the flange such that the swing arm 16 is pivotable. The pivot 17 around which the swing arm 16 is pivotable is oriented in the rightward or leftward direction so as to penetrate the flange.

The electric motor is placed rearward relative to the battery case. The electric motor is placed above the pivot. Therefore, as in Embodiment 1, in the present embodiment, the battery case 23 can be placed at a lowest possible position, and hence the center of gravity of the electric motorcycle can be lowered. Since the battery case 23 is allowed to have a lower portion with an increased dimension, the capacity of the battery 22 can be increased, and as a result, the electric motorcycle can continue to drive for a longer time. In addition, even when the electric motor 5 is increased in size, the bank angle to which the vehicle body is allowed to be banked can be increased. This can suitably enhance both the output capability and turning capability of the electric motorcycle.

Figure 4:
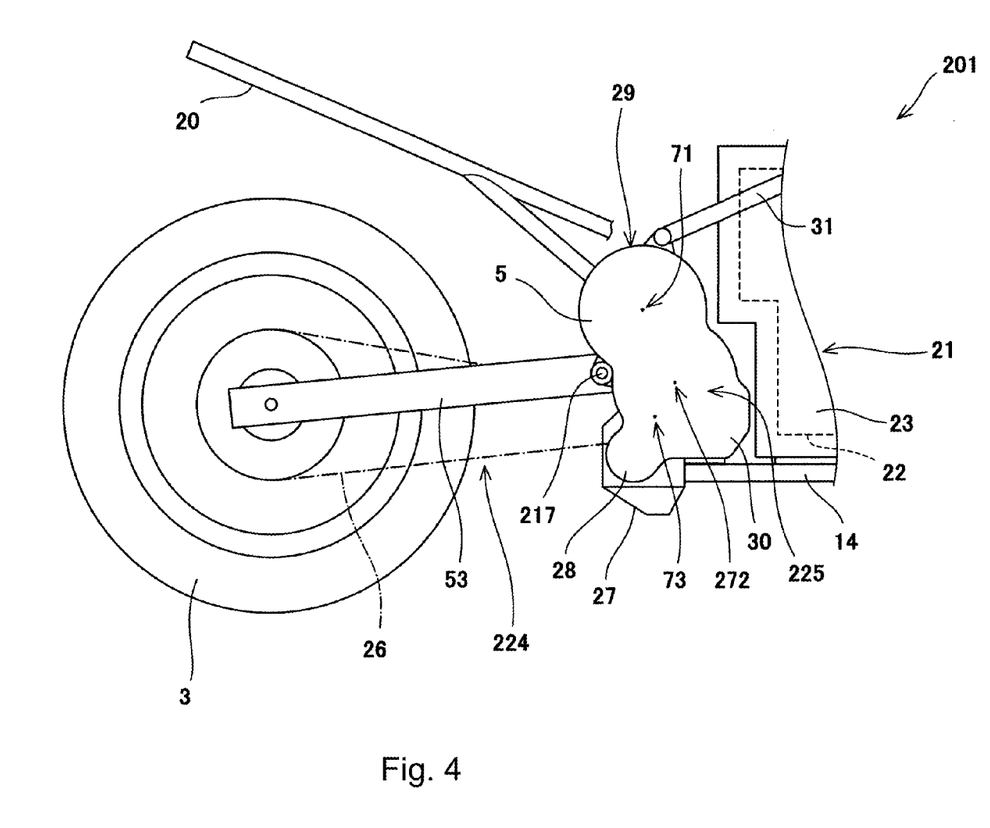
FIG. 4 is a right side view showing a region surrounding a motor unit case of an electric motorcycle, which is an exemplary straddle electric vehicle, according to Embodiment 3 of the present invention.

FIG. 4 is a right side view showing a region surrounding a motor unit case 215 of an electric motorcycle 201 which is an exemplary straddle electric vehicle according to Embodiment 3 of the present invention. Hereinafter, regarding the electric motorcycle 201 of Embodiment 3, differences from the above described embodiments will be mainly described.

As shown in FIG. 4, the electric motorcycle 201 according to the present embodiment is configured such that a driving power transmission mechanism 224 for transmitting the driving power generated by the electric motor 5 to the rear wheel incorporates a transmission 225, as in Embodiment 1. The transmission 225 is accommodated into the motor unit case 215 together with the electric motor 5. The rear portion of the motor unit case 215 is provided with a flange to which the front end portion of the swing arm 16 is coupled such that the swing arm 16 is pivotable. A pivot 217 around which the swing arm 16 is pivotable is oriented in the rightward or leftward direction so as to penetrate the flange.

An input shaft 272 of the transmission 225 is placed below the pivot 217. For this reason, the entire transmission 225 is placed below a straight line connecting the pivot 217 to the center of the rear wheel 3, when viewed from a side. Since the input shaft 272 and the pivot 217 are placed in this way, the transmission 225 can be placed at a lowest possible position. Thus, the center of gravity of the electric motorcycle can be further lowered.

Although the embodiments of the present invention have been described above, the above described configuration is merely exemplary, and can be suitably changed within a scope of the invention. For example, the radiator 34 may be placed forward relative to the oil pan 27 and below the lower frame member 14. Or, the radiator 34 may be placed laterally relative to the motor unit case 15. In this case, the ram air can be easily guided to the radiator 34, and therefore the cooling capability of the oil can be improved. The inverter 33 may be placed below the seat frame 20 as in the radiator 34, or otherwise below the lower frame member 14. In this case, the inverter 33 can be suitably cooled by the air. Even in the configuration in which the inverter 33 is placed within the air box 35, it can be cooled by the air sent from the battery case 23 through the discharge duct 37.

The battery unit 21 may be supported in such a manner that the side portions of the battery unit 21 are mounted to the side portions of the lower frame members 14, respectively, instead of supporting the bottom portion of the battery unit 21 on the lower frame members 14. In this case, the bottom portion of the battery unit 21 is located below the lower frame members 14, and hence the center of gravity of the electric motorcycle can be lowered.

The transmission 25 may be omitted. In this case, the same advantages as those of the above embodiments can be achieved, by placing the electric motor 5 rearward relative to the battery unit 21. In this configuration, preferably, the rotary shaft 71 of the electric motor 5 is placed above the pivot 17 and forward relative to the pivot 17. In the case where the transmission 25 is provided, the vertical positional relationship between the electric motor 5 and the transmission 25 may be reversed. That is, the transmission 25 may be placed above the electric motor 5. Moreover, in the case where the transmission 25 is provided, the motor accommodating section 29 and the transmission accommodating section 30 may be formed as separate components.

Although the electric motorcycle has been exemplarily described as the straddle electric vehicle according to the embodiments of the present invention, the present invention is applicable to other straddle vehicles such as an all terrain vehicle (ATV), or a three-wheeled vehicle. Although the vehicle which does not include an internal combustion engine and drives only by the driving power generated by the electric motor is exemplarily described as the electric vehicle, the present invention is also applicable to a hybrid vehicle including the internal combustion engine in addition to the electric motor.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has the advantages that the center of gravity of an electric vehicle can be lowered, and the electric vehicle can continue to drive for a longer time, and is effectively applicable to straddle electric vehicles such as an electric motorcycle, which drives by driving power generated by an electric motor.

The invention claimed is:

1. A straddle electric vehicle which drives by use of driving power generated by an electric motor, comprising:
    a battery case which accommodates a battery as an electric power supply for the electric motor, and is placed between a front wheel and a rear wheel;
    a swing arm pivotably coupled at its front end portion to a vehicle body frame such that the swing arm supports the rear wheel by its rear end portion;
    a transmission mechanism which changes a speed of the driving power generated by the electric motor;
    an inverter connected to the battery and to the electric motor; and
    an oil pan which reserves oil used for cooling and/or lubrication,
    wherein the electric motor is placed rearward relative to the battery case and forward relative to the rear wheel,
    wherein the battery case is mounted to a frame member extending below the battery case,
    wherein the transmission mechanism is placed rearward relative to the battery case, the electric motor and the transmission mechanism are arranged substantially vertically, and the electric motor is placed above the transmission mechanism,
    wherein the oil pan is placed below the transmission mechanism, and the inverter is placed above the electric motor, and
    wherein the oil reserved in the oil pan is fed to the inverter, the electric motor and the transmission mechanism, and returned to the oil pan.

2. The straddle electric vehicle according to claim 1, wherein a rotary shaft of the electric motor is placed above a pivot around which the swing arm is pivotable.

3. The straddle electric vehicle according to claim 2, wherein a front end portion of the electric motor is placed forward relative to the pivot.

4. The straddle electric vehicle according to claim 1,
wherein a rotary shaft of the electric motor is placed rearward relative to an input shaft of the transmission mechanism.

5. The straddle electric vehicle according to claim 4, comprising:
a motor accommodating section accommodating the electric motor; and
a transmission accommodating section accommodating the transmission mechanism;
wherein a front end portion of the motor accommodating section is placed rearward relative to a front end portion of the transmission accommodating section.

6. The straddle electric vehicle according to claim 5,
wherein the vehicle body frame includes a first frame which extends rearward and downward from a head pipe and is joined to a front portion of the transmission accommodating section; and
wherein the battery case is supported on the first frame in a state in which the battery case is mounted to the first frame.

7. The straddle electric vehicle according to claim 6,
wherein the vehicle body frame includes a second frame which is located above the first frame, extends rearward and downward from the head pipe, and is joined to a front portion of the motor accommodating section.

8. The straddle electric vehicle according to claim 7,
wherein the second frame is placed outward in a vehicle width direction relative to the battery case.

9. The straddle electric vehicle according to claim 5,
wherein the pivot is provided in the transmission accommodating section.

10. The straddle electric vehicle according to claim 5,
wherein an input shaft of the transmission mechanism is placed above the pivot; the straddle electric vehicle comprising:
a motor unit case including the motor accommodating section and the transmission accommodating section which are unitarily joined to each other;
wherein the motor unit case is configured as a portion of the vehicle body frame.

11. The straddle electric vehicle according to claim 1,
wherein an input shaft of the transmission mechanism is placed below the pivot.

12. The straddle electric vehicle according to claim 1,
wherein the vehicle body frame includes a down frame member extending downward from a head pipe and a lower frame member extending rearward from a lower end of the down frame member and below the battery case; and
wherein the battery case is placed rearward relative to the down frame member and mounted to the lower frame member.

13. The straddle electric vehicle according to claim 1, further comprising:
an inverter connected to the battery and to the electric motor;
wherein the inverter is placed rearward relative to the battery case and above the electric motor.

14. A straddle electric vehicle which drives by use of driving power generated by an electric motor, comprising:
a battery case which accommodates a battery as an electric power supply for the electric motor, and is placed between a front and a rear wheel;
a swing arm pivotably coupled at its front end portion to a vehicle body frame such that the swing arm supports the rear wheel by its rear end portion;
a transmission mechanism which changes a speed of the driving power generated by the electric motor;
an inverter connected to the battery and to the electric motor; and
an oil pan which reserves oil used for cooling and/or lubrication,
wherein the electric motor is placed rearward relative to the battery case and forward relative to the rear wheel,
wherein the inverter is placed rearward relative to the battery case and above the electric motor,
wherein the transmission mechanism is placed rearward relative to the battery case, and the electric motor and the transmission mechanism are arranged substantially vertically such that the electric motor is placed above the transmission mechanism;
wherein the oil pan is placed below the transmission mechanism and the inverter is placed above the electric motor, and
wherein the oil reserved in the oil pan is fed to the inverter, the electric motor and the transmission mechanism, and returned to the oil pan.

* * * * *